US007958167B2

(12) United States Patent
Diaconu et al.

(10) Patent No.: US 7,958,167 B2
(45) Date of Patent: Jun. 7, 2011

(54) INTEGRATION OF UNSTRUCTED DATA INTO A DATABASE

(75) Inventors: Cristian Diaconu, Kirkland, WA (US); Michael J. Purtell, Maple Valley, WA (US); Arkadi Brjazovski, Redmond, WA (US); Vaibhav Kamra, Seattle, WA (US); Rohan Kumar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 544 days.

(21) Appl. No.: 12/042,571

(22) Filed: Mar. 5, 2008

(65) Prior Publication Data

US 2009/0228429 A1     Sep. 10, 2009

(51) Int. Cl.
*G06F 17/30*     (2006.01)
(52) U.S. Cl. ........ 707/821; 707/822; 707/826; 711/133; 711/150
(58) Field of Classification Search ............... 707/104.1, 707/648, 791, 802, 811, 821–826; 711/133, 711/150
See application file for complete search history.

(56) References Cited

U.S. PATENT DOCUMENTS

| | | | |
|---|---|---|---|
| 5,864,849 A * | 1/1999 | Bohannon et al. ............ 707/648 |
| 6,757,695 B1 * | 6/2004 | Noveck et al. ........................ 1/1 |
| 7,103,593 B2 | 9/2006 | Dean |
| 7,155,444 B2 | 12/2006 | Krishnan et al. |
| 7,194,483 B1 | 3/2007 | Mohan et al. |
| 7,328,316 B2 * | 2/2008 | Moir et al. ..................... 711/150 |
| 7,634,760 B1 * | 12/2009 | Gumtow et al. .............. 717/125 |
| 7,779,201 B1 * | 8/2010 | Agarwal et al. ............... 711/112 |
| 2002/0157016 A1 * | 10/2002 | Russell et al. ................ 713/200 |
| 2002/0188697 A1 * | 12/2002 | O'Connor ..................... 709/219 |
| 2003/0144892 A1 | 7/2003 | Cowan et al. |
| 2005/0091287 A1 * | 4/2005 | Sedlar ........................... 707/200 |
| 2005/0114290 A1 * | 5/2005 | Borthakur et al. ................ 707/1 |
| 2006/0047636 A1 | 3/2006 | Mohania et al. |
| 2006/0047713 A1 * | 3/2006 | Gornshtein et al. .......... 707/202 |
| 2006/0129745 A1 | 6/2006 | Thiel et al. |
| 2007/0061487 A1 | 3/2007 | Moore et al. |
| 2007/0100823 A1 | 5/2007 | Inmon |
| 2007/0156966 A1 * | 7/2007 | Sundarrajan et al. ......... 711/133 |
| 2007/0174360 A1 | 7/2007 | Yagawa |
| 2007/0185934 A1 * | 8/2007 | Cannon et al. ................ 707/204 |
| 2007/0219976 A1 | 9/2007 | Muralidhar et al. |
| 2008/0043760 A1 * | 2/2008 | Venkatraman et al. ....... 370/401 |
| 2008/0043761 A1 * | 2/2008 | Kumar et al. ................. 370/401 |

(Continued)

OTHER PUBLICATIONS

Graeme Malcolm. Managing Unstructured Data with SQL Server 2008. SQL Server Technical Article, Published: Aug. 2007, Applies to: SQL Server 2008. http://download.microsoft.com/download/a/c/d/acd8e043-d69b-4f09-bc9e-4168b65aaa71/SQL2008UnstructuredData. doc. Last accessed Nov. 7, 2007, 11 pages.

(Continued)

*Primary Examiner* — Hanh B Thai
(74) *Attorney, Agent, or Firm* — Workman Nydegger

(57) ABSTRACT

The claimed subject matter provides a system and/or a method that extends transactional guarantees to unstructured data in a file system. A database engine, configured to retain structured data, can reserve a portion of the file system to store unstructured data to be managed by the database engine. A kernel component can associate a transaction with at least one stream that corresponds to the reserved portion of the file system. The association enables transaction based access to the reserved portion of the file system managed by the database engine.

12 Claims, 11 Drawing Sheets

U.S. PATENT DOCUMENTS

| | | | |
|---|---|---|---|
| 2008/0065443 A1* | 3/2008 | Gorur et al. | 705/7 |
| 2008/0222152 A1* | 9/2008 | Godbole | 707/8 |
| 2009/0006494 A1* | 1/2009 | Hong et al. | 707/202 |
| 2009/0037763 A1* | 2/2009 | Adhya et al. | 714/4 |
| 2009/0199285 A1* | 8/2009 | Agarwal et al. | 726/9 |

OTHER PUBLICATIONS

Eric Chu, et al. A Relational Approach to Incrementally Extracting and Querying Structure in Unstructured Data. VLDB '07, Sep. 23-28, 2007, Vienna, Austria. VLDB Endowment, ACM 978-1-59593-649-3/07/09. http://pages.cs.wisc.edu/~ericc/VLDB2007.pdf. Last accessed Nov. 7, 2007, 12 pages.

Michael Vizard, et al. IBM: Xperanto Rollout To Start In Early 2003. From the Jan. 3, 2003 issue of CRN http://www.crn.com/it-channel/18838697. Last accessed Nov. 7, 2007, 2 pages.

Mark Smith. Informatica Powers Up Data Integration, Apr. 17, 2007. http://www.businessintelligence.com/ex/asp/id.233/xe/biresearchdetail.htm. Last accessed Nov. 7, 2007, 3 pages.

* cited by examiner

INTEGRATION OF UNSTRUCTED DATA INTO A DATABASE

BACKGROUND

A computer database is a structured set of data that enables users to store data, modify data and/or extract data. The structural blueprint of the database is provided by a schema. The schema describes the significance of individual records. In addition, the schema specifies relationships between and among records. There are a variety of schema organizations that correspond to a plurality of data models employable in database systems. For example, a commonly utilized model is a relational model that organizes data in tables with columns and rows, wherein each column is an attribute and each row is a record. Other possible data models include a hierarchical model, a network model, an associative model, a concept-oriented model, an object oriented model, an entity relationship model, and the like.

In addition, databases attempt to provide and enforce properties associated with a transaction. A transaction is one or more database operations that are treated as a unit or set. An important property of transactions is that all operations in the transaction set must successfully complete for any of the operations to take effect. Databases provide transactions in order to maintain the integrity of the database and the data retained therein.

According to certain definitions, a file system can be considered similar to a database. A file system includes a collection of abstractions that facilitate storing, organizing, navigating, retrieving and/or manipulating data on a storage device. Often, the file system is responsible for maintaining physical locations of data files on the storage device. In addition, the file system can retain data of multiple forms, types and/or structures. Typically, modifications or changes to files in the file system occur in real time such that the changes persist once made. This is distinct from some databases where interactions with the database must reach a particular stage before persisting.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

The subject innovation relates to systems and/or methods that facilitate extending transactional behavior of a database system to a file system. In particular, transactional behavior is provided in connection with unstructured data retained in the file system but managed as part of the database system. In general, a file system does not provide transactional guarantees to clients accessing and/or modifying files. Moreover, databases can retain unstructured data within the data model concurrently with structured data. However, the database cannot provide access and storage of unstructured data as efficiently as the file system. The subject innovation integrates the transactional behavior of the database system with the efficient storage capabilities of the file system. The integration enables manipulations of structured data in the database and modifications of unstructured data in the file system to operate within context of a single transaction.

A kernel mode component can be provided that monitors access to unstructured data in the file system and manages the data within the context of a database transaction. According to an aspect, a database provisions a subset of the file system wherein the subset is employed to retain unstructured data for the database. The kernel mode component controls access to the subset of the file system when potential access is associated with the database. For example, the kernel mode component administers access to the subset for the database and/or clients of the database. However, the kernel mode component does not interfere with normal file system operation perceived by other applications, systems and/or users interfacing with the file system. The kernel mode component exports a set of entry points or shares that lead into the subset of the file system. While the database can employ physical paths to access the subset, clients of the database employ the shares to interface with the subset of the file system. The kernel mode component monitors handles and streams associated with the subset. Upon a transaction commit, the kernel mode component hardens the files in the subset by flushing buffers and/or controllers so that all modifications can persist as a single entity. In addition, the kernel mode component can undo changes made to the files upon a transaction roll back.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
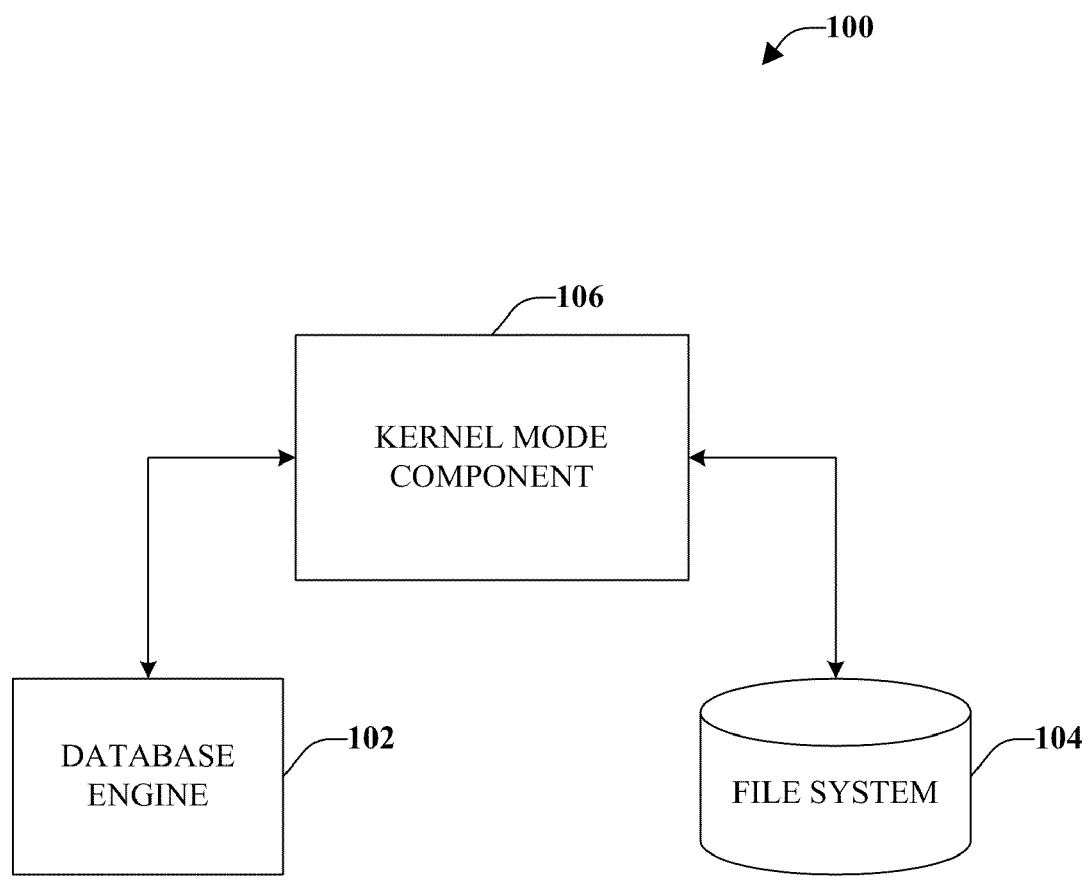
FIG. 1 illustrates a block diagram of an exemplary system that enables transactional access to unstructured data in a file system.

The subject matter disclosed herein relates to integrating unstructured data retained in a file system and relational or transactional capabilities of a database. More specifically, a file system is utilized to store unstructured data that is traditionally stored in the database. In addition, strong transactional guarantees of database systems are extended to the unstructured data stored in the file system. According to one aspect, the file system stores streams (e.g., unstructured data) while the database is employed to retain namespaces and attributes of the streams. The performance and large-scale characteristics of the file system are leveraged to store unstructured data that is managed by the database while transactional behavior of a traditional relational database is preserved. Various systems and methods are described hereinafter with respect to integration between file systems and databases.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Now turning to the figures, FIG. 1 illustrates a system 100 that facilitates extending transactional guarantees to unstructured data. A database engine 102 is provided that is configured to store structured data (e.g., relational data, tabular data, etc.). In one embodiment, the database engine 102 can be a relational database management system that employs structured query language (SQL) as a query language. It is to be appreciated that other database systems and/or models can be employed. For example, the database engine 102 can utilize a hierarchical model, a network model, an object model or the like. The system 100 further includes a file system 104 configured to retain unstructured data. The file system 104 can store and organize files and data contained in the files. The file system 104 can utilized a computer-readable storage medium to store such files. The computer-readable storage medium can include a hard disk, an optical disc, a floppy disc, flash memory, random access memory, read only memory, a network storage device, etc. The file system 104 can be contained within a physical storage volume, a logical storage volume or extend across a plurality of physical and/or logical storage volumes.

As used herein, structured data refers to data that is stored, managed, and/or manipulated according to the model employed by the database engine 102. For example, if the database engine 102 utilizes a relational model (e.g., database engine 102 is a relational database management system), structured data would be relational data. Unstructured data refers to data that is not stored, managed and/or manipulated in accordance with the model employed by the database engine 102. In addition, unstructured data can include data that cannot be readily transformed to conform with the model of the database engine 102. By way of illustration and not limitation, a word processor document can be an example of unstructured data. While the word processor document includes structural elements, these elements enable a word processor to format and present the document. The structural elements typically do not facilitate the processing of information content of the document.

Traditionally, database systems would retain unstructured data within the database and not outside the database (e.g., in the file system). Similarly, file systems do not typically implement transactional behavior. Accordingly, storing unstructured data in a database does not leverage the efficiency of file systems in regards to storing such data. Further, storing unstructured data in the file system does not provide strong transactional guarantees associated with database systems. In accordance with an aspect, unstructured data can be managed by the database system and stored in the file system. The unstructured data can be under the control of the database system. The control enables the database system to extend to the unstructured data properties and guarantees provided to the structured data in the database.

The system 100 further includes a kernel mode component 106 that enables the database engine 102 to manage unstructured data retained by the file system 104. The database engine 102 reserves a portion of the file system 104 wherein the portion stores unstructured data managed by the database engine 102. The kernel mode component 106 maintains the reserved portion and associates the reserved portion with the database engine 102 or a particular database instance of the database engine 102. Once the portion is created and reserved, the kernel mode component 106 enables the database engine 102 or one or more users (not shown) to access to the reserved portion of the file system 104. In one embodiment, access is provided through the kernel component 106. However, it is to be appreciated that the database engine 102, or the one or more users, can access the reserved portion of the file system 104 directly so long as the kernel mode component 106 can monitor and/or control the access. This level of oversight enables transactional guarantees to be extended to the unstructured data.

According to an aspect, the kernel mode component 106 enables access to the unstructured data in the file system 104 within the realm of a transaction. A transaction is an atomic operation on data that must be either entirely completed or entirely aborted. Typically, the database engine 102 or other database system guarantees atomicity, consistency, isolation and durability for a transaction concerning structured data within the database. The property of atomicity specifies that either all tasks in a transactional operation are performed successfully or none are performed. Consistency specifies that the data maintains a legal state (e.g., complies with integrity constraints) before and after a transaction. Isolation refers to the apparent seclusion of one transaction from another transaction. For example, one application cannot observe intermediate data generated by a transaction from another application. The property of durability specifies that, following successful completion of a transaction, the transaction persists or is committed such that cannot be undone. The kernel mode component 106 extends the concept of the transaction to unstructured data in the file system 104 that is contained within the reserved portion. The kernel mode component 106 monitors, controls or provides access to the reserved portion of the file system 104 by the database engine 102 or users such that the kernel component 106 maintains transactional guarantees with the access.

In addition, the system 100 can include any suitable and/or necessary interfaces, which provides various adapters, connectors, channels, communication paths, etc. to integrate the database engine 102, the file system 104 and the kernel mode component 106 into virtually any operating and/or database system(s) and/or with one another. In addition, the interfaces can provide various adapters, connectors, channels, communication paths, etc., that provide for interaction with the in situ database engine 102, the file system 104, the kernel mode component 106 and any other device and/or component associated with the system 100.

Figure 2:
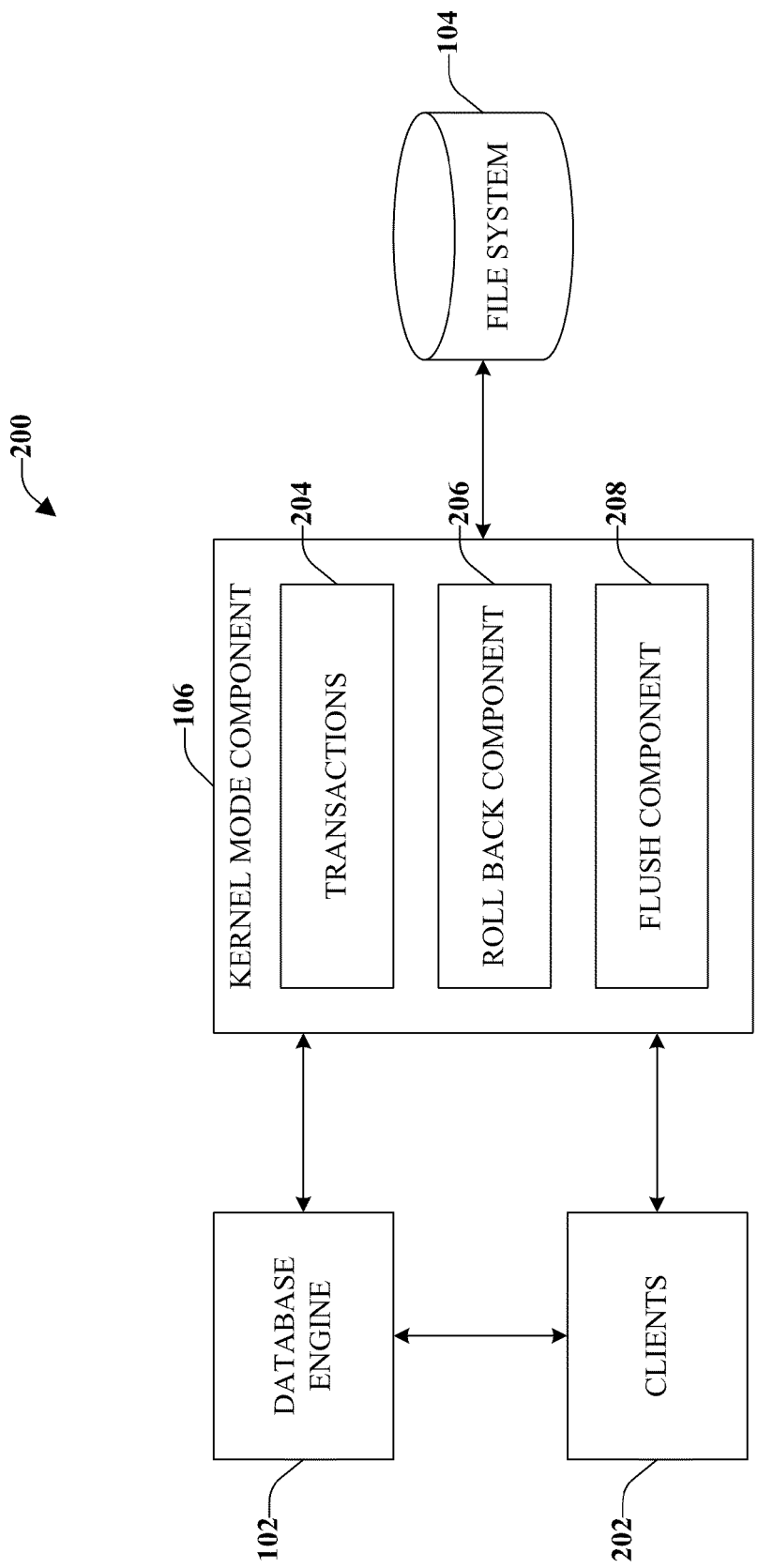
FIG. 2 illustrates a block diagram of an exemplary system that manages transactions associated with unstructured data in a file system.

FIG. 2 illustrates a system 200 that facilitates transaction-based access to unstructured data managed by a database engine 102 and stored in a file system 104. The system 200 includes a kernel mode component 106 that enables database engine 102 and clients 202 to access to unstructured data from the file system 104 transactionally. In addition, clients 202 can communicate with the database engine 102 to obtain structured data stored within the database. Pursuant to an illustration, clients 202 can employ queries in any suitable query language to collect structured data. For example, clients 202 can utilized a SQL statement on the database engine 102 to retrieve data in accordance with the query.

The kernel mode component 106 includes one or more transactions 204. The transactions 204 correspond to write accesses to the unstructured data in the file system 104 by the database engine 102 and/or clients 202. The kernel mode component 106 manages the transactions 104 in association with the accesses in order to provide transactional guarantees in relation to the unstructured data. The database engine 102 reserves a portion of the file system 104. The reserved portion retains unstructured data managed by the database engine 102.

Typically, the database engine 102 and/or clients 202 accesses the file system 104 (and unstructured data stored thereon) through file streams. Streams are abstractions of sequences of bytes. The sequences of bytes can be from files on a file system, network data, memory data, etc. File streams are sequences of bytes that are read from or written to a file on a file system. Pursuant to an illustration, a stream can be associated with a file on a file system. When an application (e.g., a user) writes data to the stream, the data is written to the associated file. In one embodiment, the application program interface (API) employed with unstructured data in the file system 104 is handle-based. A call to create a file either generates a new file in the file system 104 or opens an existing file. Upon completion of the create file call, a file handle is obtained. The file handle can be linked to a file stream to enable read and/or write access to the file via the stream.

Typically, when a user (e.g. the database engine 102 and/or clients 202) accesses unstructured data (e.g. a file) in the file system 104, the user is afforded no transactional guarantees. Pursuant to an illustration, when one user modifies a file, other users working with the same file immediately observe the modification. Thus, traditional unstructured data access violates the isolation property of transactions. In addition, file modifications cannot be rolled back. Typical file access cannot guarantee atomicity.

The kernel mode component 106 facilitates access to unstructured data in the file system 104 through traditional methods (e.g., file handles, streams, etc.) while integrating the transactional model of the database engine 102. The database engine 102 creates a transaction instance at a user's request. For example, the database engine 102 can create a transaction instance in the kernel mode component 106 when the database engine 102 is notified that the client 202 is accessing a file contained within the reserved portion of the file system 104. In addition, the database engine 102 itself can access unstructured data on behalf on the clients 202 and create the transaction instance in advance. The file stream or file handle of the clients 202 is associated with the created transaction. Alternatively, the stream of the database engine 102 is associated with the created transaction depending on which entity requests access and/or which entity performs access. It is to be appreciated that more than one file stream can be associated with a single transaction. For example, the clients 202 can modify two or more streams within the context of a transaction.

The kernel mode component 106 manages the transaction created by the database as part of a set of transactions 204. The set of transactions 204 include active atomic groups of operations on the file system 104. The active atomic groups of operations can originate from the clients 202, the database engine 102, or any other databases and/or clients. With each transaction in the set of transactions, the kernel mode component 106 monitors the entity (e.g., database engine or client) performing the transaction operations, the open files or streams of the transaction, a state of the transaction, etc. The kernel mode component 106 maintains the aforementioned information in a broader context of an object model and a transaction model that is described supra.

The kernel mode component 106 can ensure transactional guarantees with streams when the streams are linked to a transaction from the set of transactions 204. For example, in a transaction, clients 202 and/or database engine 102 can modify a file via a stream. The clients 202 and/or the database engine 102 is the only entity that observes changes in the file until the transaction commits. Further, modifications to streams associated with transactions 204 can be rolled back so no changes result or persist. Accordingly, the kernel mode component 106 manages transactions and monitors access to the reserved portion of the file system 104 to provide transactional guarantees such as the illusion of isolation. In the addition, the kernel mode component 106 provides atomicity via the ability to commit or roll back modifications made through operations in a transaction.

To extend the transaction model of database systems to unstructured data (e.g., to streams in the file system 104), the kernel mode component 106 provides both roll back and commit functions. The kernel mode component 106 includes roll back component 206 that effectuates a roll back of a transaction. For a roll back of the transaction, the roll back component 206 invalidates all files or streams associated with the transaction. Once invalidated, no input/output to the file or stream can pass to the file system 104 beyond the point of roll back. Once the roll back component 206 initiates a roll back, the only operation available to the database engine 102 or the client 202 is to close the file stream or handle. The roll back component 206 abandons all modifications made to unstructured date during the transaction and invalidates the means to effectuate additional change. Thus, the roll back component 206 preserves atomicity by preventing persistence of only a portion of a transaction.

To commit a transaction, the kernel mode component 106 must ensure persistence and durability against failure (e.g. system crash). To guarantee persistence with unstructured data in the file system 104, any modifications made to a file or stream in a transaction must be hardened to the file system 104 upon transaction commit. Hardening refers to flushing to the file system 104 every byte of data from hardware buffers and/or controllers that is written to a stream. In database systems, every transaction that commits is typically hardened or logged to a single transaction log. According to an aspect, the kernel mode component 106 hardens each individual stream involved in a transaction. The kernel mode component 106 includes a flush component 208 that effectuates hardening streams to the file system 104. The flush component 208 flushes data from hardware buffers and/or controllers to the file system 104 wherein the data is written to one or more streams involved in a committed transaction.

To minimize the total number of file flushes, the flush component 208 can employ selective flushing. In general, a file or stream needs to be flushed when a transaction associated with the file commits or when a last reference to the file is released (e.g., the file has been closed by all entities previously engaged therewith). However, this set of flush points can be further reduced by recognizing several aspects. Firstly, a file does not need to be flushed if no modifications have been made. In addition, flushing is not necessary at close processing if the processing is initiated by releasing the last reference to the file. Next, there is no need to flush during close processing if there exists another reference to the file within the same transaction. Similarly, a file need not be flushed during a commit operation if there are other references to the same file within the same transaction that will be processed later in a commit sequence. For example, two references can exist for the same file in a transaction. The file only needs to be flushed upon the last remaining reference to the file during commit as opposed to flushing at both instances. In addition, every volume that includes files that have been accessed should be flushed at least once to ensure metadata operations are hardened. However, a volume does not require flushing if any files within that volume have been flushed.

Figure 3:
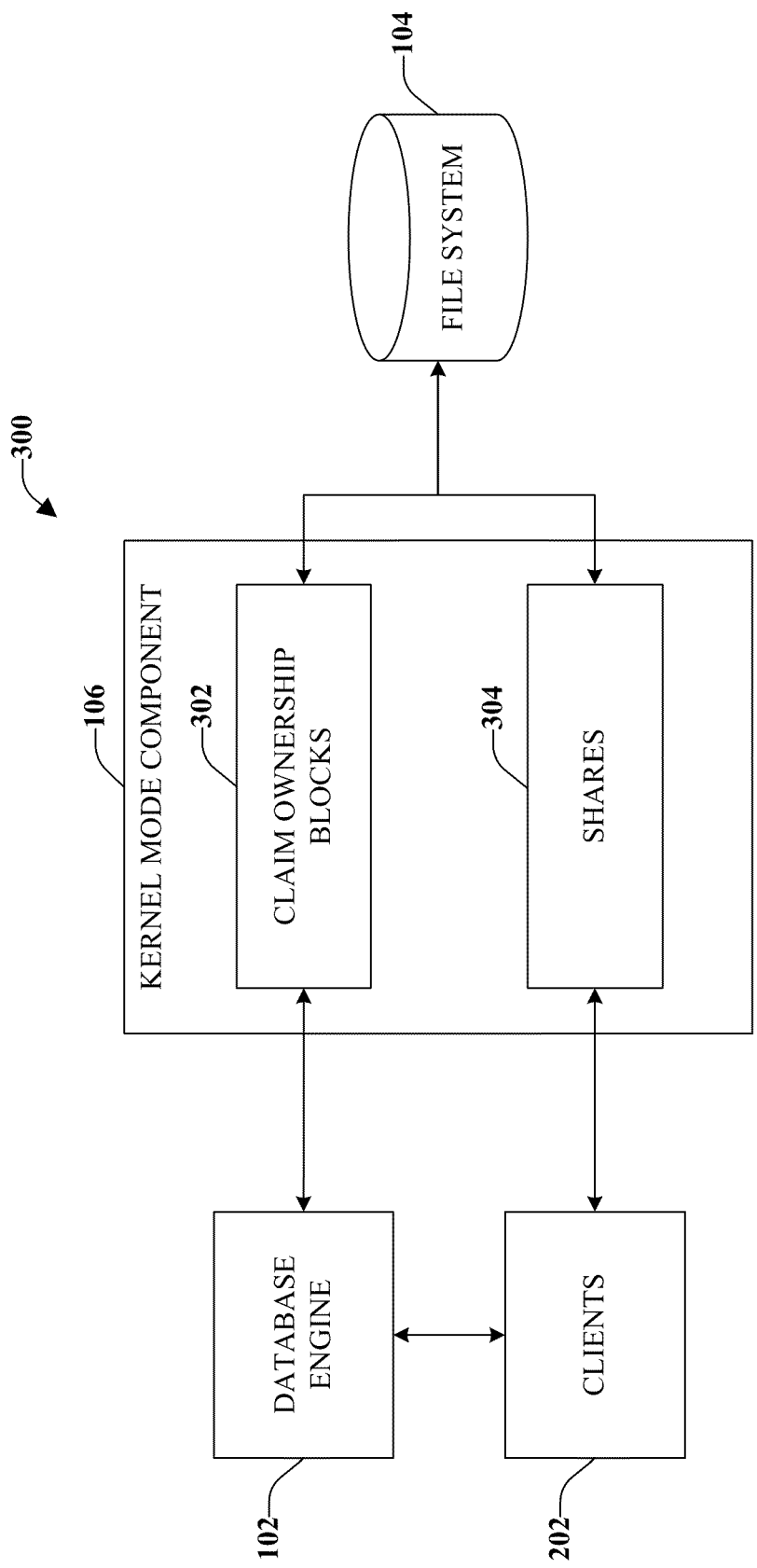
FIG. 3 illustrates a block diagram of an exemplary system that manages file ownership of unstructured data in a file system in accordance with aspect of the subject disclosure.

FIG. 3 illustrates a system 300 that facilitates ownership and/or access to unstructured data retained in a file system 104. A database engine 102, configured to retain structured data, can reserve a portion or subset of the file system 104 to store unstructured data that is managed by the database engine 102. Claim ownership grouping is the approach where the database engine 102 provisions the portion of the file system 104 for storage and management of unstructured data. The portion includes certain containers (e.g., directories) carved out of the file system 104 that become managed by the database engine 102. These certain containers are placeholders were stream data is retained and, moreover, where access is linked to a transaction instance. A kernel mode component 106 retains the reservation in order to track transactions related to the reserved portion of file system 104. The kernel mode component 106 includes a set of claim ownership blocks (COBs) that correspond to the portions of the file system 104 provisioned by the database engine 102 and any other database instance interacting with the file system 104. A COB is a unit of management of storage at a file system level. A database system instance can create a COB, register the COB with the kernel mode component 106, manage the COB, and/or eventually delete the COB. A COB is the primary construct by which the database engine 102 interacts with the file system 104 and, in particular, the unstructured data stored therein. In one embodiment, a claim ownership block is uniquely identified in the set of claim ownership blocks 302 by a {Volume, Path} tuple. The kernel mode component 106 ensures that within the same volume, COBs from the set of COBs 302 do not have overlapping paths. The kernel mode component 106 prevents database engine 102 from accessing and potentially misinterpreting unstructured data retained in a COB of a different database instance.

As discussed infra, clients 202 can access managed unstructured data via conventional APIs (e.g., streams, handles, etc.). The kernel mode component 106 enables open access to unstructured data contained in the claim ownership blocks 302 through shares 304. Share level grouping is the approach wherein a set of well-define entry points are exported to end users. The entry points or shares are ports that lead into a namespace of the database engine 102 (e.g., claim ownership blocks allocated by the database engine 102). The database engine 102 can manage user files based on the shares employed by the clients 202 to create and/or modify the file within a claim ownership block. Shares 304 can be utilized similar to conventional network shares such as server message block (SMB) shares, common internet file system (CIFS) shares, network file system (NFS) shares or the like. For example, a network share name (e.g., //server/share) can be employed to access unstructured data in a claim ownership block managed by the database engine 102.

A level of symmetry exists between claim ownership blocks 302 and shares 304. Claim ownership blocks 302 are utilized to track internal create requests and shares 304 are employed to monitor external create requests. A create request can be a request that generates a new file or file stream in the file system 104 or opens an existing file or file stream. An external create request or an out-of-band request occurs when clients 202 communicate a create request from a remote or local system. The clients 202 includes a set of well-formed parameters that specify a location in the file system 104 associated with a claim ownership block (e.g., a reserved portion). An internal create request or in-band request is a request generated from the database engine 102 on any file or stream within a path covered by a claim ownership block provisioned by the database engine 102. However, a create request from the database engine 102 regarding a file within a claim ownership block linked to another database instance is an external request.

The kernel component 106 tracks external requests by associating the request with a share from the set of shares 304 that was employed to access the database namespace included as a parameter of the request. Similarly, the kernel component 106 tracks internal requests by associating the request with a claim ownership block from the collection of claim ownership blocks 302. According to an aspect, the associated claim ownership block is discovered by matching a file prefix utilized by the database engine 102 during generation of the create request. Pursuant to an illustration, the kernel mode component 106 associates create requests to either a share or claim ownership block by linking a stream or handle resulting from the request to the share or claim ownership block.

The kernel mode component 106 further associates internal and external create requests with a transaction instance. As described above with reference to FIG. 2, a transaction instance is created by the database engine 102. A file stream create request can include additional parameters that enables the kernel mode component 106 to associate the file stream with a transaction. Upon create, the kernel mode component 106 can monitor active file streams associated with a transaction in order to guarantee atomicity and other properties through flushing all of the file streams in the transaction upon commit.

Figure 4:
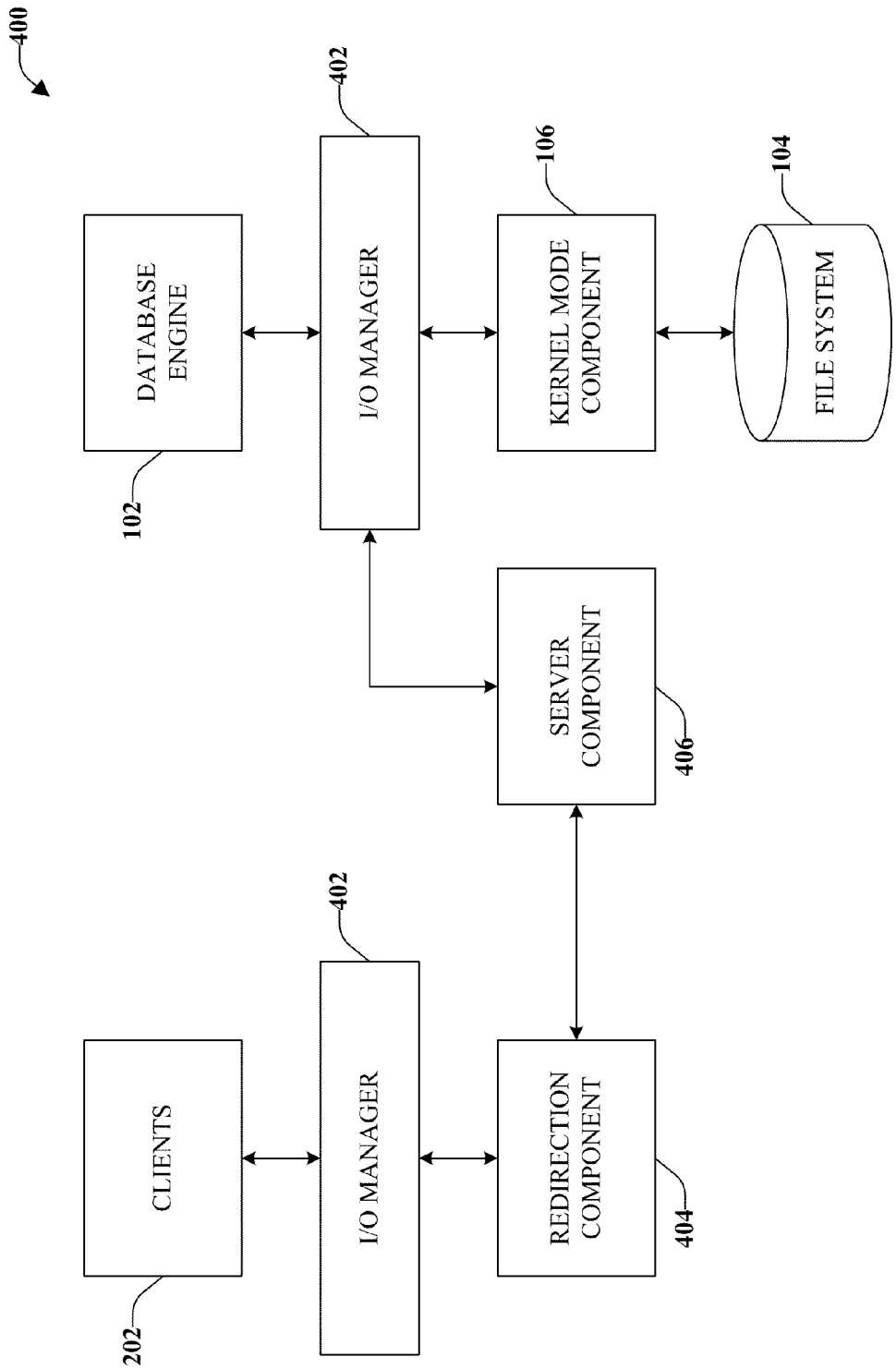
FIG. 4 illustrates a block diagram of an exemplary system that facilitates access to unstructured data managed by a database engine.

FIG. 4 illustrates a system 400 that facilitates access to unstructured data managed by a database engine 102 and retained in a file system 104. The database engine 102 can provision one or more claim ownership blocks in the file system 104. The one or more claim ownership blocks are portions or subsets of the file system reserved for unstructured data managed by the database engine 102. The one or more claim ownership blocks created by the database engine 102 are monitored and/or tracked by a kernel mode component 106. The kernel mode component 106 maintains a relationship between the claim ownership blocks and the database engine 102.

In one embodiment, the system 400 includes an I/O manager 402 that dispatches and manages all input/output (I/O) activity in the system 400. For example, the database engine 102 can communicate with the file system 104 and/or the kernel mode component 106 (e.g., via file stream create requests, claim ownership block provisions, etc.). The I/O manager 402 can receive the communications from the database engine 102 and forward them to the appropriate recipient.

The system 400 includes clients 202 that interact with database engine 102. The client 202 can be an application on the same machine as the database engine 102 or a remote machine communicatively coupled to the database engine 102 via a network or other communications medium. In situations where the client 202 is located on a remote machine, the client 202 interfaces with another I/O manager 402 that dispatches and manages I/O activity on the remote machine. The client 202 issues a request to access either the structured data or the unstructured data managed by the database engine 102. The request is dispatched by the I/O manager to a redirection component 404. The redirection component 404 is responsible for forwarding local requests (e.g., request originating from a local entity, client or application) to a remote machine that includes the database engine 102.

On the remote machine or server, the redirection component 404 communicates with a server component 406. The server component 406, among other things, manages connections from one or more clients of the redirection component 404. In one embodiment, the server component 406 offers the database engine 102, the kernel component 106 or other components an illusion that client 202 is a local client. In addition, the server component 406 exports shares (e.g., ports into the namespace of the database engine 102) to access unstructured data in the file system 104.

In accordance with an aspect of the subject disclosure, the server component 406 redirects the remote database request to the I/O manager 402. Depending on the nature of the request, the I/O manager 402 forwards the request to the database engine 102 and/or the kernel mode component 106. For example, the request can be a database query such as a SQL statement and the I/O manager 402 provides the request to the database engine 102 for processing (e.g. query structured data in the database). Alternatively, the request can be a create file request for unstructured data in the file system 104 that is managed by the database engine 102. For create file request, the I/O manager 402 provides the request to the kernel mode component 106 to enable tracking and monitoring of the resultant file stream in connection with a transaction, a claim ownership block, a share, or the like.

Figure 5:
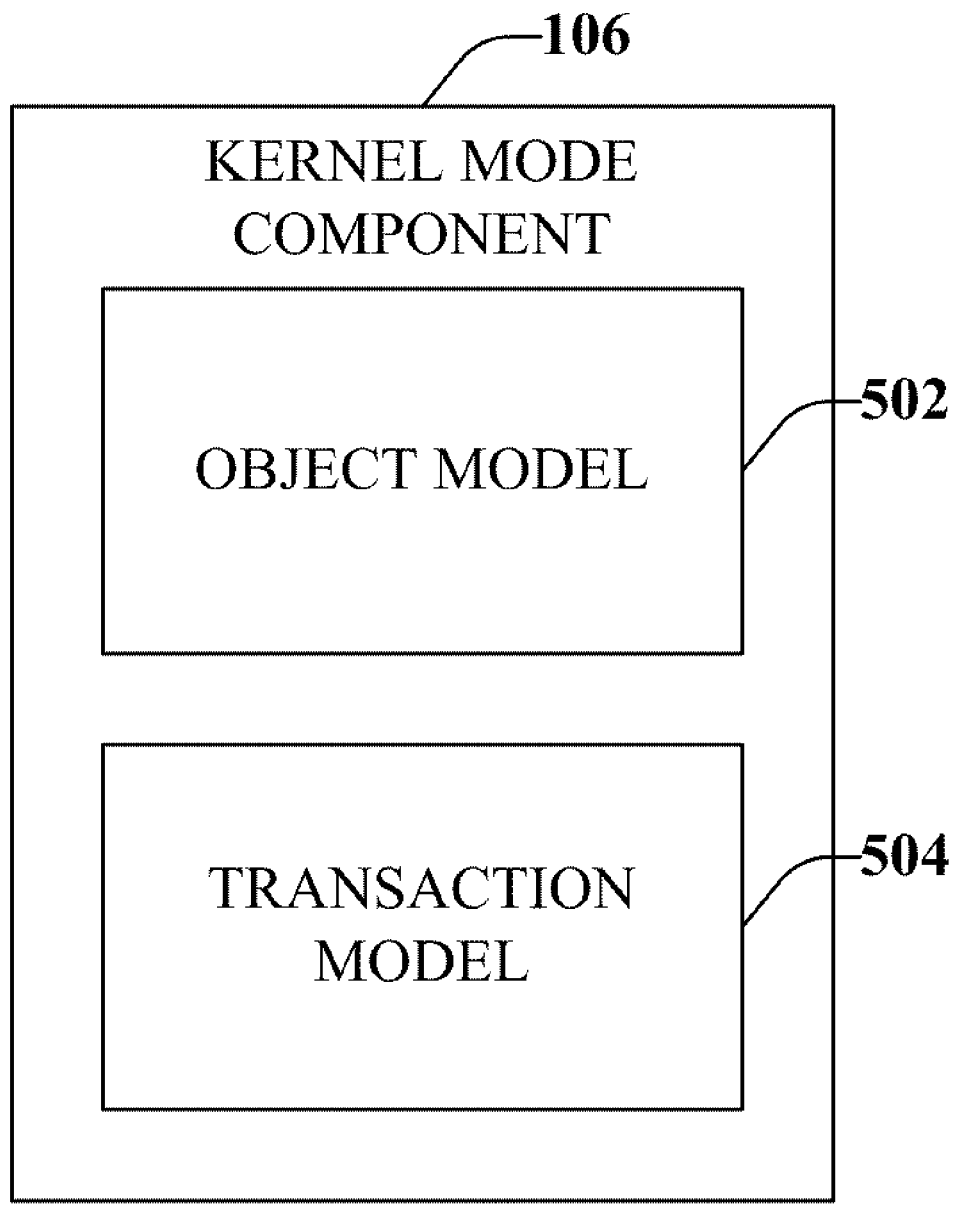
FIG. 5 illustrates a block diagram of an exemplary system that includes a representative kernel component according to one aspect of the subject disclosure.

FIG. 5 depicts a representative kernel mode component 106 that includes an object model 502 and a transaction model 504. The kernel mode component 106 employs the object model 502 to manage, track, link and/or control transactions 204, claim ownership blocks 302, shares 304, open streams, and the like. The object model 502 enables the kernel mode component 106 to maintain information necessary to ensure transactional guarantees of the database are extended to unstructured data in the file system. The object model is a data structure that includes a plurality of interconnected objects or modules that each represent a different aspect of extending transactions to unstructured data. The kernel mode component 106 includes a transaction model 504 that facilitates monitoring transactions associated with unstructured data and guaranteeing the transactional properties to the unstructured data that are typically provided in a conventional database system. For example, the transaction model 504 manages the states of objects in the object model 502 as a transaction progresses, completes, and/or fails.

Figure 6:
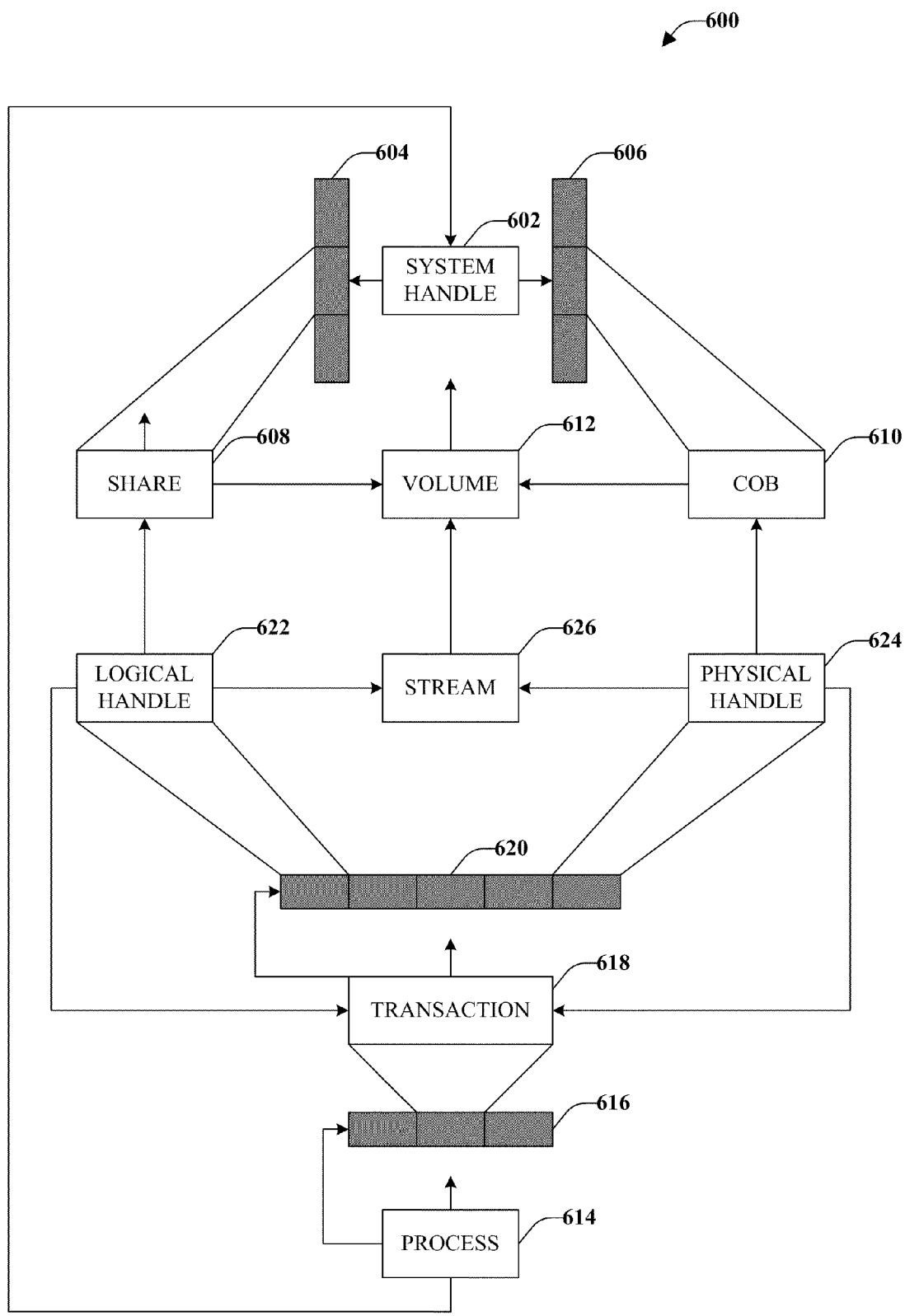
FIG. 6 illustrates a block diagram of an object model that facilitates management of transactions and file ownership.

FIG. 6 illustrates an exemplary structure of an object model 600 that enables the kernel mode component 106 to manage disparate entities involved in transactions that include unstructured data in the file system. Objects in the object model 600 include a pointer count field, a reference count field, a type field, a siblings field, and a parent field. The pointer count field contains a value that is incremented every time an internal component acquires a pointer to the object. The value indicates a number of internal clients of the object. An internal component or client is an entity such as another object that is also included in the object model 600. The reference count field is similar to the pointer count field except this value indicates the number of external components or clients that acquire a pointer or reference to the object. The type field explicitly indicates the type of an object. For example, an object can be one of a plurality of types such as a volume object, a share object, a transaction object, etc. The types of possible objects will be discussed in detail supra. The siblings field is a list of all objects of the same type as a given object. The parent field includes a pointer to a parent object of a given object. The object model 600 is organized as a hierarchy of objects and most objects have a parent field that points to another object in the hierarchy. For example, a logical handle object has a share object as a parent if the handle represented by the logical handle object was opened on a logical path via the share represented by the share object.

The lifetime of any particular object in the object model 600 is governed by the pointer count field and the reference count field. When the values in these fields are zero, no other objects hold pointers or references to the particular object. The object is marked for destruction and all resources associated therewith are released and reclaimed.

The object model 600 includes a system handle object 602 that represents a handle opened by an end user (e.g. an application, client, database, etc.) to the kernel mode component 106. The system handle object 602 is not a requirement of the object model 600 but its inclusion can provide benefits. For example, the system handle object 602 includes list of shares 604 that includes all shares managed by the kernel mode component and a list of claim ownership blocks 606 indexed by the kernel mode component. The list of shares 604 is comprised of one or more individual objects such as a share object 608. The share object 608 represents a share that operates as a port into namespaces of all database instances on a system that includes the kernel mode component 106 and object model 600. The kernel mode component 106 attempts to satisfy create requests for files and/or streams to unstructured data in the file system when the request targets a share represented by a share object in the object model 600. Shares can be either public or private. A public share has a reference count field with a value greater than zero. The share object 608 does not have a parent within the object model 600 and, accordingly, the parent field is a null pointer. The pointer count field is equal to the number of files opened through the share represented by the share object 608.

The list of claim ownership blocks 606 comprises of one or more individual objects such as a claim ownership block (COB) object 610. The COB object 610 represents a claim ownership block that is employed by a database instance to declare ownership of a container or portion of a file system. Similar to the share object 608, the COB object 610 can be either public or private depending on the value of the reference count field. In addition, the pointer count field is equal to the number of files opened through the claim ownership block represented by the COB object 610.

The share object 608 and the COB object 610 are associated with a volume object 612. The share object 608 includes a unique field to contain a reference to the volume object 612. The reference is employed to optimize volume resolution requests. For example, when a client issues a create file request through a share, the volume of the file system that includes the share is determined. On an initial request through the share, the kernel mode component queries the database instance associated with a reserved portion of the file system indicated in the share to retrieve volume information represented by the volume object 612. The volume information is cached in the unique field of share object 608 to expedite future requests. Unlike the share object 608, the COB object 610 is associated with the volume object 612 via the parent field. The volume object 612 is a parent of any COB object if the volume object 612 represents the volume that hosts the physical container, directory or portion of the file system reserved with the claim ownership block. The volume object 612 does not have a parent and has a reference count field value of zero (e.g., the volume object is not exposed to external components).

When the system handle object 602 is created, a process object 614 is automatically instantiated. The process object 614 represents a database instance. Accordingly, the number of process objects is equivalent to the number of database instances in communication with the kernel mode component. The process object 614 includes a list of transactions 616. The list of transactions 616 comprises all transactions owned or associated with the process object 614 and, accordingly, the database instance represented by the process object 614. When the process object 614 is destroyed (e.g., the associated database instance closes), all pending transactions in the list of transactions 616 are rolled back.

The list of transactions 616 comprises of one or more individual objects such as a transaction object 618. The transaction object 618 is created as clients open file streams. When a client generates a create file request, the kernel mode component determines if the extended attributes of the request indicate an existing transaction or if a new transaction is required. When a new transaction is required, a new transaction object is instantiated and associated with a process object representing the appropriate database instance. This association is maintained until the database instance initiates a pre-commit or a roll back. When the database instance (e.g., database engine 102) initiates a pre-commit action, the kernel mode component verifies that all files linked to a particular transaction are closed. Open files upon pre-commit aborts the action. If all files are closed, the kernel mode component flushes all files and invalidates handles to prevent future file reads or file writes via the handles. Upon a roll back action, the kernel mode component invalidates all handles of a transaction and prevents further access. The transaction component 618 includes a state field that indicates the current state of a transaction according to the transaction model.

Figure 7:
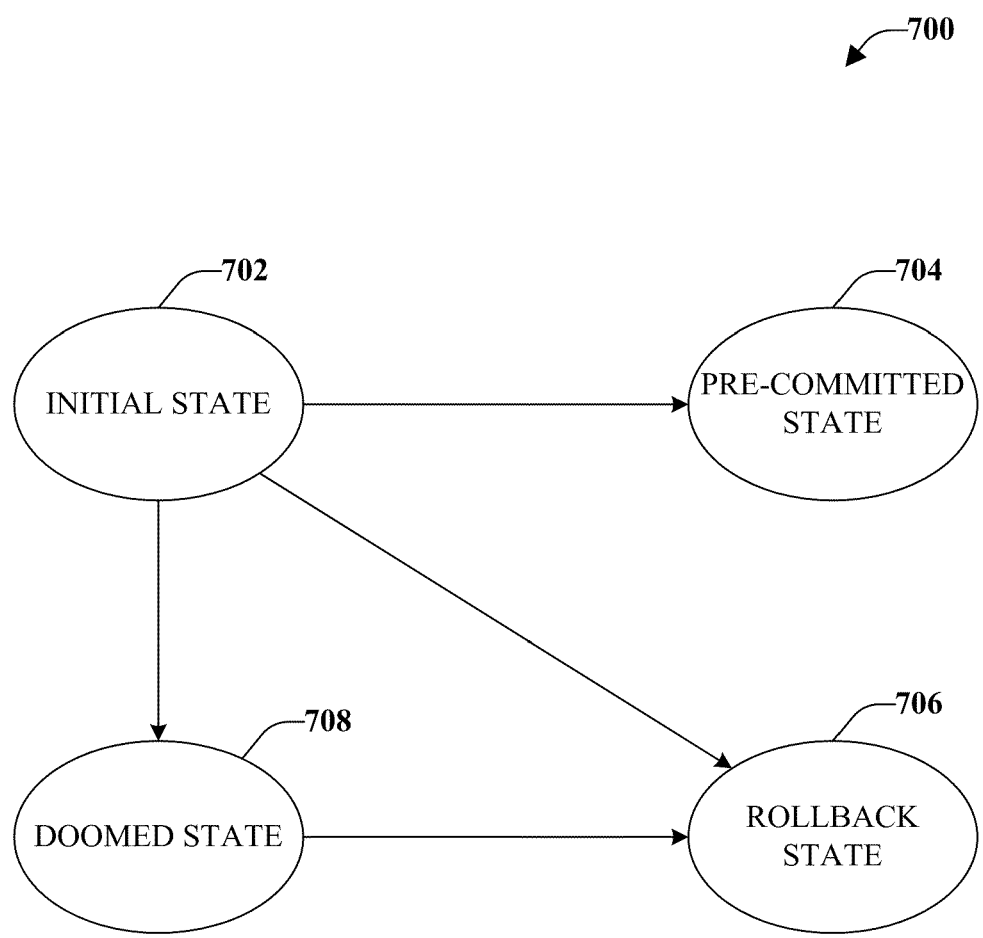
FIG. 7 illustrates a state diagram of a transaction model in accordance with an aspect of the subject disclosure.

Turning briefly to FIG. 7, illustrated is a state diagram 700 of a transaction object in accordance with the transaction model. State 702 is the initial state of a transaction. A newly created transaction defaults to state 702. In the initial state 702, a transaction proceeds normally. A client creates files, modifies, closes files, etc. Upon initiation of a commit action, the kernel mode component verifies that all files associated with the transaction are closed. In addition, the kernel mode component invalidates all handles to prevent further access to the files. Moreover, the kernel mode component flushes the files to ensure that all written data is pushed from hardware buffers and/or controllers into the file system. If all conditions are satisfied, the transaction transitions into a pre-committed state 704. In this state, the transaction can be fully committed with all transactional guarantees intact.

If errors occur during the transaction, a roll back is initiated. The transaction transitions into a rolled back state 706 and all changes are abandoned leaving the system in an unchanged state. As files in a transaction close, the files are flushed by the kernel mode component. Sometimes, a flush operation can fail. Typically, a file close operation does not allow an error to be returned. Thus, a client cannot be notified that the flush operation failed. In accordance with the transaction model, the transaction transitions into a doomed state 708. A doomed transaction cannot be committed and any attempt to commit will return an error indicating the flush has failed. A transaction in the doomed state 708 can roll back any intermediate modifications of the transaction and transition into the rolled back state 706.

Referring back to FIG. 6, the transaction object 618 further includes a list of handles 620 that comprises all handles to files associated with the transaction object 618. The handles included in the list of handles 620 can be a logical handle object 622 or a physical handle object 624. The logical handle object 622 represents a handle to a file opened via a logical path. Logical paths are the basis for out-of-band access or access through a share. The parent field of the logical handle object 622 includes a reference to the share object 608 that represents the share indicated by the logical path. In addition, the logical handle object 622 includes a field that references the associated transaction object 618. The physical handle object 624 is similar to the logical handle object 622. However, the physical handle object 624 represents a handle to a file opened in-band by a database instance with a physical path. The parent field of the physical handle object 624 includes a reference to the claim ownership block object 610 that represents the claim ownership block covering the physical path utilized to create the physical handle object 624. Similar to the logical handle object 622, the physical handle object 624 includes a pointer to the associated transaction object 618.

The logical handle object 622 and the physical handle object 624 both include a field that includes a reference to a stream object 626. While the handle objects 622 and 624 represent client handles to files, the stream object 626 represents the file in the file system. The stream object 626 is created when a first handle for the associated file is created. Further handles to the file will acquire a reference to the existing stream object 626. In other words, only a single stream object is created for a particular file even though multiple clients can access the file (e.g., acquire a handle to the file). The stream object 626 retains a reference to the volume object 612 that represents the volume on which the file resides.

Figure 8:
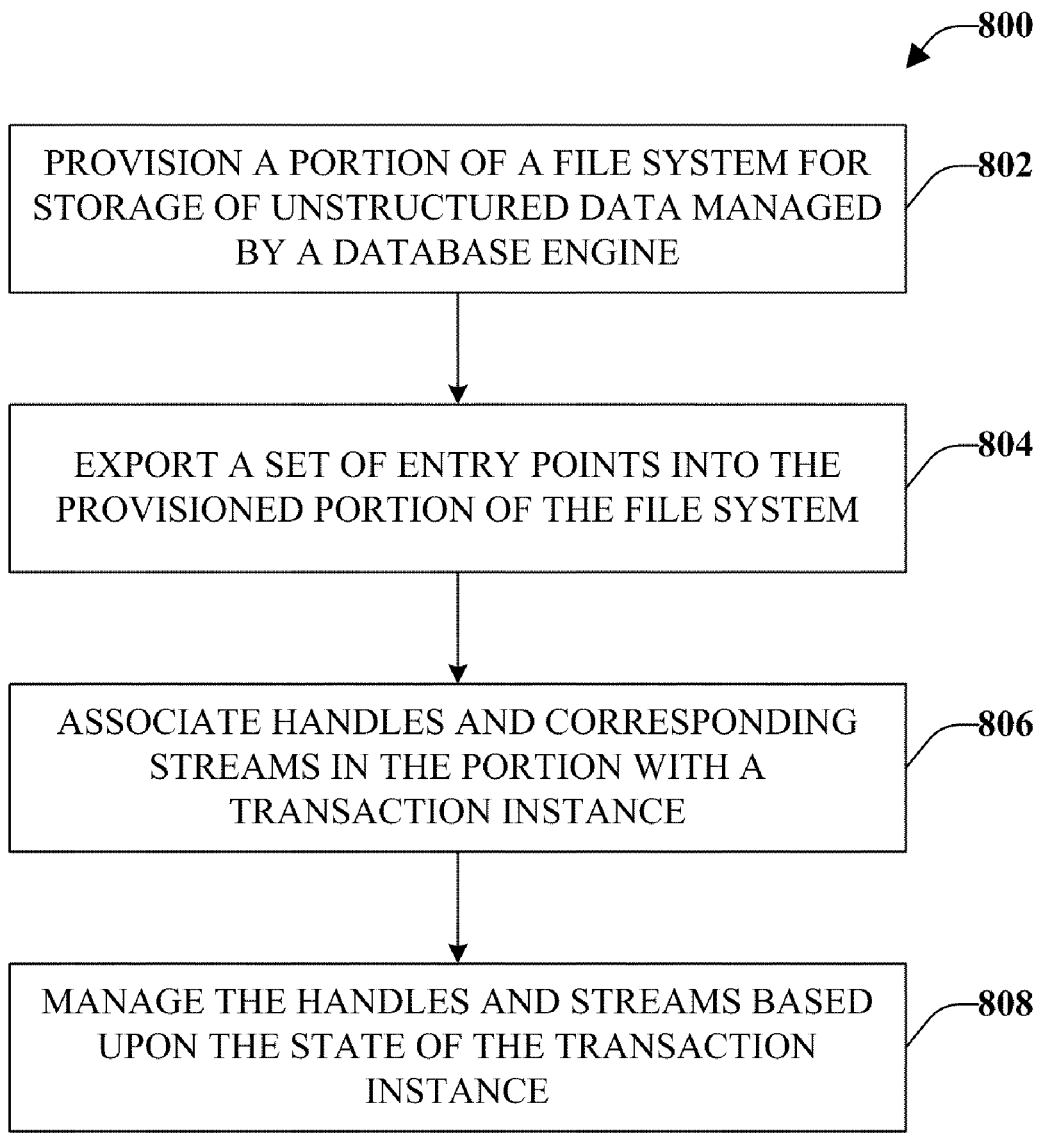
FIG. 8 illustrates an exemplary methodology for extending transactional guarantees to unstructured data in a file system.
Figure 9:
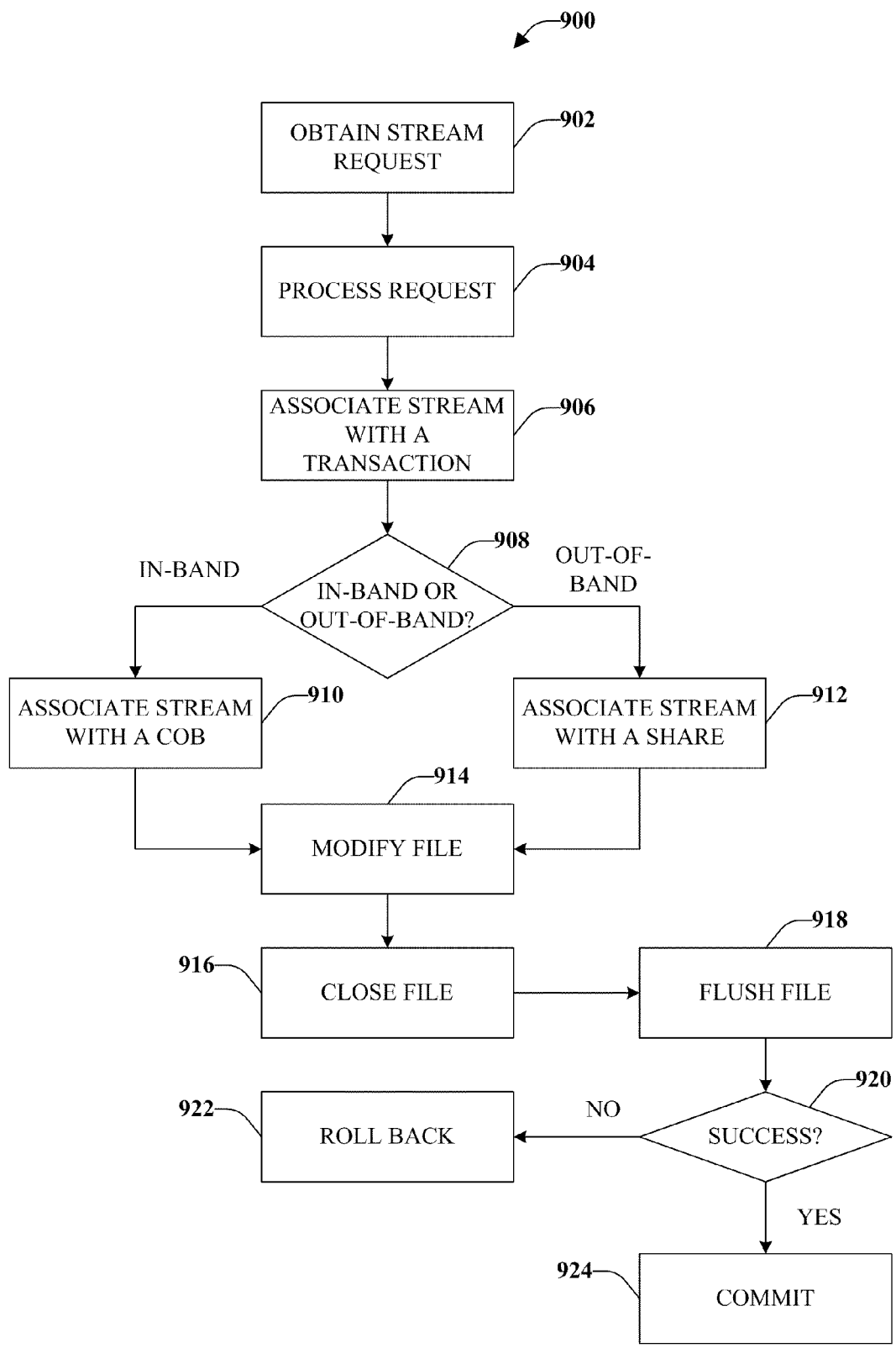
FIG. 9 illustrates an exemplary methodology for accessing unstructured data in a file system.

FIGS. 8-9 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a method 800 that facilitates extending transactional behavior of a database system to unstructured data in a file system. At reference numeral 802, a portion of a file system is provisioned for storage of unstructured data managed by a database engine. The database engine employs the provisioned portion to retain unstructured data instead of storing such unstructured data in the database itself. The provisioned portion is a claim ownership block associated with the database engine and monitored by a kernel mode component. At reference numeral 804, a set of entry points into the provisioned portion of the file system are exported. The set of entry points are shares that can be accessed by clients that are local or remote. Shares are ports into the namespace of the database engine and, accordingly, into the claim ownership block representing the provisioned portion of the file system. Through shares, clients can access files within the provisioned portion and modify unstructured data managed by the database engine. At reference numeral 806, handles and corresponding streams within the portion are associated with a transaction instance. Pursuant to an illustration, a stream can be associated with a file on the file system. The API employed to interact with streams and unstructured data in the file system can be handle-based. For example, a request to create a file either generates a new file or opens an existing file. Upon processing of the request, a handle is obtained. The file handle can be linked to a file stream to enable read and/or write access to the file via the stream. Further, to provide transactional guarantees to stream data as well as database data, the handles and streams are associated with a transaction so that access can be monitored and controlled. At reference numeral 808, the handles and streams are managed based upon the state of the transaction instance. For example, the handles and streams are invalidated to prevent further access when the transaction instance is transitioned into a roll back state. Invalidation can also occur after flushing the files but prior to committing the transaction.

FIG. 9 illustrates a methodology 900 that facilitates accessing unstructured data retained in a file system and managed by a database. At reference numeral 902, a stream request is obtained. A stream request can be a create file request for a new file or a request for an existing file in the file system. At reference numeral 904, the request is processed to either create a new file or return a handle to the existing file. At reference numeral 906, the new file or handle the existing file is associated with a transaction. The association extends transactional guarantees to unstructured data access by enabling an entity to monitor file I/O within the context of the transaction. At reference numeral 908, a determination is made as to whether the obtained request is a in-band request or an out-of-band request. An in-band request originates from the database that reserved a portion of the file system. An out-of-band request is generated by a client (e.g., an application, a user, etc.) that can be local or remote. If the request is in-band, the stream or handle is associated with a claim ownership block that contains the file corresponding to the stream or handle at reference numeral 910. If the request is an out-of-band request, the method 900 proceeds to reference numeral 912 where the stream is associated with a share. At reference numeral 914, the file corresponding to the stream is modified. For example, a client can write data to the file. At reference numeral 916, the file is closed. Pursuant to an illustration, a file can be closed whenever a client and/or database no longer needs to write data. The file can be closed at any time during a transaction. At reference numeral 918, the file is flushed. Flushing the file involves ensuring all data in hardware buffers and/or controllers is perpetuated into the file system. At reference numeral 920, a determination is made as to whether the flush is successful. If unsuccessful, the method 900 proceeds to reference numeral 922 where the transaction is rolled back and the modifications to the file are undone. Once a transaction is rolled back, the file is in an unchanged state and all work is abandoned. If the flush is successful, the method 900 proceeds to reference numeral 924 and the transaction commits. A committed transaction indicates that all modifications performed during the transaction persist.

Figure 10:
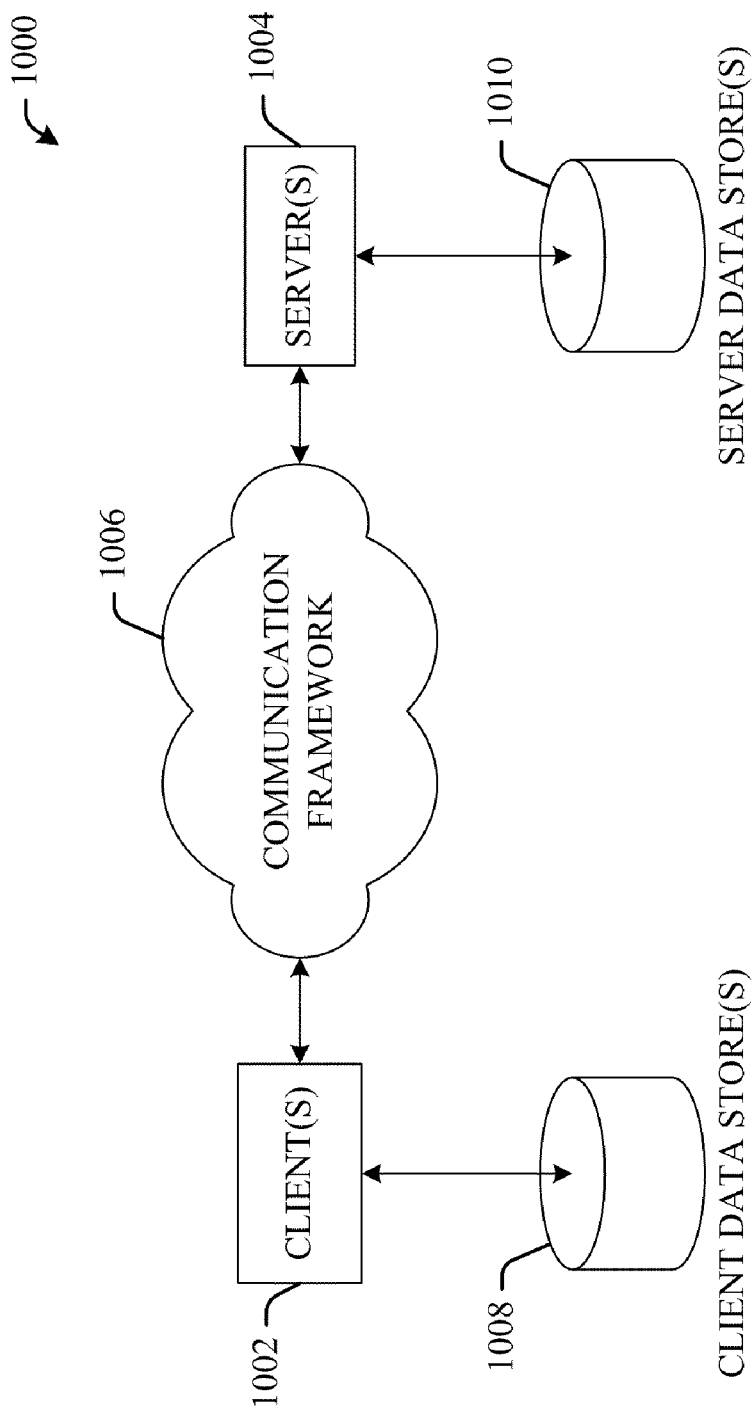
FIG. 10 is a schematic block diagram illustrating a suitable operating environment.
Figure 11:
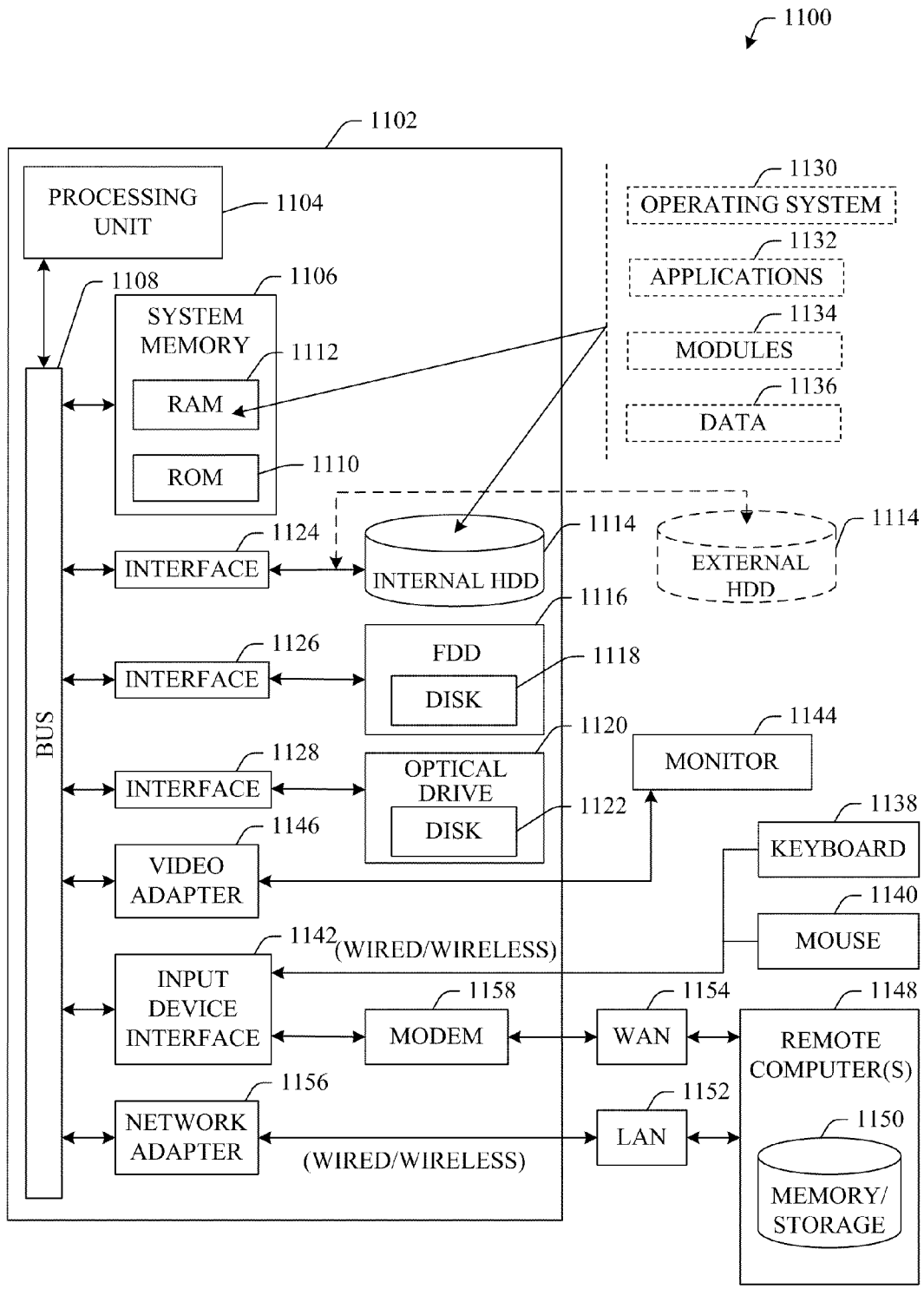
FIG. 11 is a schematic block diagram of a sample computing environment.

In order to provide a context for the various aspects of the disclosed subject matter, FIGS. 10 and 11 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 10, there is illustrated a schematic block diagram of a computing environment 1000 in accordance with the subject specification. The system 1000 includes one or more client(s) 1002. The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware and/or software (e.g., threads, processes, computing devices). The servers 1004 can house threads to perform transformations by employing the specification, for example. One possible communication between a client 1002 and a server 1004 can be in the form of a data packet adapted to be transmitted between two or more computer processes. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

Referring now to FIG. 11, there is illustrated a block diagram of a computer operable to execute the disclosed architecture. In order to provide additional context for various aspects of the subject specification, FIG. 11 and the following discussion are intended to provide a brief, general description of a suitable computing environment 1100 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 11, the example environment 1100 for implementing various aspects of the specification includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also include a high-speed RAM such as static RAM for caching data.

The computer 1102 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1194 interface technologies. Other external drive connection technologies are within contemplation of the subject specification.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the specification can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1194 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are example and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. In a computing environment comprising a processor operatively coupled to a memory, a computer-implemented method for facilitating transaction-based access to unstructured data stored in a file system by managing access to the unstructured data with a database engine, the method comprising:
provisioning a subset of a file system that is configured to store and manage unstructured data with one or more claim ownership blocks (COBs), the one or more COBs providing access to unstructured data stored as one or more file streams within the subset of the file system via one or more handles corresponding to the one or more file streams;

associating the one or more COBs with a database engine that is configured to store and manage structured data structured according to a data model, the one or more COBs providing the database engine access to the unstructured data;

exporting to one or more clients a set of entry points into the subset of the file system, thereby enabling local and remote access to the unstructured data corresponding to the one or more COBs via at least one share that leads into a namespace of the database engine;

the database engine creating a transaction instance that facilitates transaction-based access to the unstructured data stored within the subset of the file system;

associating at least one handle of the one or more handles and a corresponding file stream with the transaction instance; and managing the at least one handle based at least in part on a state of the associated transaction instance to provide transactional guarantees to the corresponding file stream, the transactional guarantees including atomicity and isolation of the at least one file stream among the one or more clients.

2. The method of claim 1, further comprising flushing the at least one handle upon close of processing of the at least one handle or when the state of the transaction instance is a pre-commit state.

3. The method of claim 2, wherein flushing the at least one handle is selective in that flushing is skipped when at least one of the following conditions hold true:

file streams associated with the at least one handle have not changed;

the at least one handle is a last reference to a file stream; or the at least one handle references a file stream that includes a subsequent reference within a same transaction.

4. The method of claim 1, further comprising associating the at least one handle to an entry point within the set of entry points when the at least one handle originates from a remote client.

5. The method of claim 1, further comprising associating the at least one handle to a claim ownership block when the at least one handle originates from the database.

6. The method of claim 1, further comprising:

receiving a request for the file stream;

in response to the request, obtaining the at least one handle, the at least one handle corresponding to a new or existing file stream within the subset of the file system; and determining that the request is an in-band request from the database engine, and in response, associating the at least one handle with a COB that provides access to the new or existing file stream.

7. The method of claim 6, further comprising:

modifying the new or existing file stream;

closing the new or existing file stream;

flushing the file stream; and determining that the flush was successful, and in response, committing the transaction instance.

8. The method of claim 6, further comprising:

modifying the new or existing file stream;

closing the new or existing file stream;

flushing the file stream; and determining that the flush was unsuccessful, and in response, rolling back the transaction instance to restore the new or existing file stream to an unmodified state.

9. The method of claim 1, further comprising:

receiving a request for the file stream;

in response to the request, obtaining the at least one handle, the at least one handle corresponding to a new or existing file stream within the subset of the file system; and determining that the request is an out-of band request from one of the one or more clients, and in response, associating the at least one handle with a share corresponding to a COB that provides access to the new or existing file stream.

10. The method of claim 1, wherein each COB is uniquely identified by a {Volume, Path} tuple.

11. A computer-implemented system comprising a processor operatively coupled to a memory and one or more computer-readable storage media, the storage media having computer-executable instructions that, when executed by the processor, implement the method of claim 1.

12. One or more computer-readable storage media storing computer-executable instructions that, when executed by a processor, perform the method of claim 1.

* * * * *